US006671127B2

(12) United States Patent
Hsu et al.

(10) Patent No.: US 6,671,127 B2
(45) Date of Patent: Dec. 30, 2003

(54) MAGNETIC RECORDING SYSTEM WITH SINGLE COIL FOR THERMALLY ASSISTED WRITING

(75) Inventors: Yimin Hsu, Sunnyvale, CA (US); Andreas Moser, San Jose, CA (US); Hemantha K. Wickramasinghe, San Jose, CA (US); Xiao Z. Wu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 09/916,094

(22) Filed: Jul. 25, 2001

(65) Prior Publication Data

US 2003/0021191 A1 Jan. 30, 2003

(51) Int. Cl.[7] .............................................. G11B 5/147
(52) U.S. Cl. ....................................................... 360/123
(58) Field of Search ................................. 360/111, 125, 360/123, 124, 126, 128, 122; 369/13.01

(56) References Cited

U.S. PATENT DOCUMENTS

| | | | | |
|---|---|---|---|---|
| 5,909,340 A | * | 6/1999 | Lairson et al. ........... 360/237.1 |
| 5,986,978 A | * | 11/1999 | Rottmayer et al. ...... 369/13.17 |
| 6,016,290 A | * | 1/2000 | Chen et al. .............. 369/13.17 |
| 6,256,171 B1 | * | 7/2001 | Yoda et al. .............. 360/235.3 |
| 6,317,280 B1 | * | 11/2001 | Nakajima et al. ............. 360/59 |
| 6,404,706 B1 | * | 6/2002 | Stovall et al. ........... 369/13.17 |
| 6,493,183 B1 | * | 12/2002 | Kasiraj et al. .............. 360/126 |
| 2001/0017820 A1 | * | 8/2001 | Akiyama et al. ............. 369/13 |

FOREIGN PATENT DOCUMENTS

JP         2000030214 A   *   1/2000   ............ G11B/5/23

* cited by examiner

Primary Examiner—Brian E. Miller
(74) Attorney, Agent, or Firm—Thomas R. Berthold; Daniel E. Johnson

(57) ABSTRACT

A thermally-assisted magnetic recording (TAMR) write head simultaneously generates heat and a magnetic write field to the recording layer on a magnetic recording disk. The write head is located on the trailing face of a head carrier in a TAMR disk drive and comprises a single turn coil, part of which is a current strip having an edge located at the disk-facing surface of the head carrier. When write current is passed through the current strip heat is generated at the edge of the strip and a magnetic write field is induced at the disk surface. The strip edge has a predetermined width that substantially corresponds to the desired track width of the data bits. Because both heat and the magnetic write field are generated by the same element, the heat gradient and the magnetic write field gradient are co-located on the spot where the data bit is written.

14 Claims, 6 Drawing Sheets

MAGNETIC RECORDING SYSTEM WITH SINGLE COIL FOR THERMALLY ASSISTED WRITING

RELATED APPLICATION

This invention is related to application Ser. No. 09/608,848 filed Jun. 29, 2000 and entitled "Thermally-Assisted Magnetic Recording System with Head having Resistive Heater in Write Gap".

TECHNICAL FIELD

This invention relates to digital magnetic recording, and more particularly to a magnetic recording disk drive where data is written while the magnetic recording layer is at an elevated temperature.

BACKGROUND OF THE INVENTION

Magnetic recording disk drives store digital information by using a miniaturized thin film inductive write head. The write head is patterned on the trailing face or surface of a head carrier, typically a slider that also has an air-bearing surface (ABS) to allow the slider to ride on a thin film of air above the surface of the rotating disk. The write head is an inductive head with a thin film electrical coil located between the pole pieces of a magnetic yoke. When write current is applied to the coil, the tips of the pole pieces provide a localized magnetic field across a gap that magnetizes regions on the recording layer on the disk into one of two distinct magnetic states that represent the recorded data bits.

The magnetic material for use as the recording layer on the disk is chosen to have sufficient coercivity such that the magnetized data bits are written precisely and retain their magnetization state until written over by new data bits. The data bits are written in a sequence of magnetization states to store binary information in the drive and the recorded information is read back with a use of a read head that senses the stray magnetic fields generated from the recorded data bits. Magnetoresistive (MR) read heads include those based on anisotropic magnetoresistance (AMR), giant magnetoresistance (GMR), such as the spin-valve type of GMR head, and the more recently described magnetic tunnel junction (MTJ) effect. Both the write and read heads are kept in close proximity to the disk surface by the slider's ABS, which is designed so that the slider "flies" over the disk surface as the disk rotates beneath the slider.

As the recording bit size decreases to increase the data density on the disk, a problem arises with the conventional thin film inductive write head and writing process that is referred to as the "superparamagnetic" effect. The areal data density (the number of bits that can be recorded on a unit surface area of the disk) of magnetic disk drives is approaching the point where the data bits are so small they can be demagnetized simply from thermal agitation within the magnetized bit (the so called the "superparamagnetic" effect). The conventional approach to circumventing this problem is to increase the magnetic anisotropy and coercivity of the magnetic material in the recording layer on the disk to improve the thermal stability. However, this requires that the write head be made with a material with high saturation moment to increase the write field of the head so the head can write on the high coercivity media. Based on the properties of known materials, the ultimate write field of the head can only be increased by about 30%, thus severely limiting future data density growth. In addition, the increased data rate required at higher areal density requires that the magnetic properties of the materials used in the write head have to be optimized, which is very difficult to achieve if the materials suitable for use are limited to only those that have a very high saturation moment.

Since it is known that the coercivity of the magnetic media (i.e., the magnetic recording layer on the disk) is temperature dependent, one proposed solution is "thermally assisted" magnetic recording (TAMR), wherein the magnetic material in the media is heated locally to near or above its Curie temperature during writing so that the coercivity is low enough for writing to occur, but high enough for thermal stability of the recorded bits at ambient temperature. Several approaches to TAMR have been proposed, including use of a laser beam or ultraviolet lamp to do the localized heating, as described in *IBM Technical Disclosure Bulletin*, Vol. 40, No. 10, October 1997, pp. 65-66, and IBM's U.S. Pat. No. 5,583,727. In these approaches, the heating area is typically wider than the data bit so that the data bit dimension is still determined by the size of the write head.

One of the problems still to be addressed in TAMR is the design of a write head that co-locates the heat and the magnetic write field to the same spot on the magnetic layer of the media, preferably to a region no larger than the size of the data bit to be recorded. A write head for use in a magneto-optic (MO) or TAMR system is described in U.S. Pat. No. 5,986,978, wherein a special optical channel is fabricated adjacent to the pole or within the gap of the inductive write head for thermally assisted writing of the MO or magnetic media by directing laser light or heat down the channel. IBM's previously cited application Ser. No. 09/608,848 describes a TAMR write head that uses a conventional thin film inductive write head and an electrically separated resistive heater located in the write gap between the pole tips of the inductive write head. The resistive heater directs heat to a region on the magnetic layer of the disk and the pole tips of the inductive write head direct the magnetic write field to the heated region. These TAMR head designs that use a separate heating element isolated from the inductive write coil require complex fabrication processes and/or electrical wiring layouts.

What is needed is a TAMR write head that co-locates heat and the magnetic write field and that is easier to fabricate and implement in a TAMR system than prior TAMR write heads.

SUMMARY OF THE INVENTION

The invention is a thermally-assisted write head to simultaneously generate heat and a magnetic write field to the magnetic recording layer on the disk, and a TAMR disk drive that uses the write head. The write head is located on the trailing face of a head carrier and comprises a single turn coil, part of which is a current strip having an edge located at the disk-facing surface of the head carrier. When write current is passed through the current strip heat is generated at the edge of the strip and a magnetic field is induced at the disk surface. The strip edge has a predetermined width that substantially corresponds to the desired track width of the data bits. Because both heat and the magnetic write field are generated by the same element, the heat gradient and the magnetic write field gradient are co-located on the spot on the recording layer where the data bit is written. In a second embodiment a magnetic yoke surrounds the single turn coil with the current strip located in the write gap between the pole tips of the yoke, so that current through the strip also induces a magnetic write field across the pole tips. In a third embodiment the single turn coil is the primary turn of a multi-turn coil, with the secondary coil turns located in the yoke but away from the current strip and the pole tips.

For a fuller understanding of the nature and advantages of the present invention, reference should be made to the following detailed description taken together with the accompanying figures.

DETAILED DESCRIPTION OF THE INVENTION

Prior Art

Figure 1B:
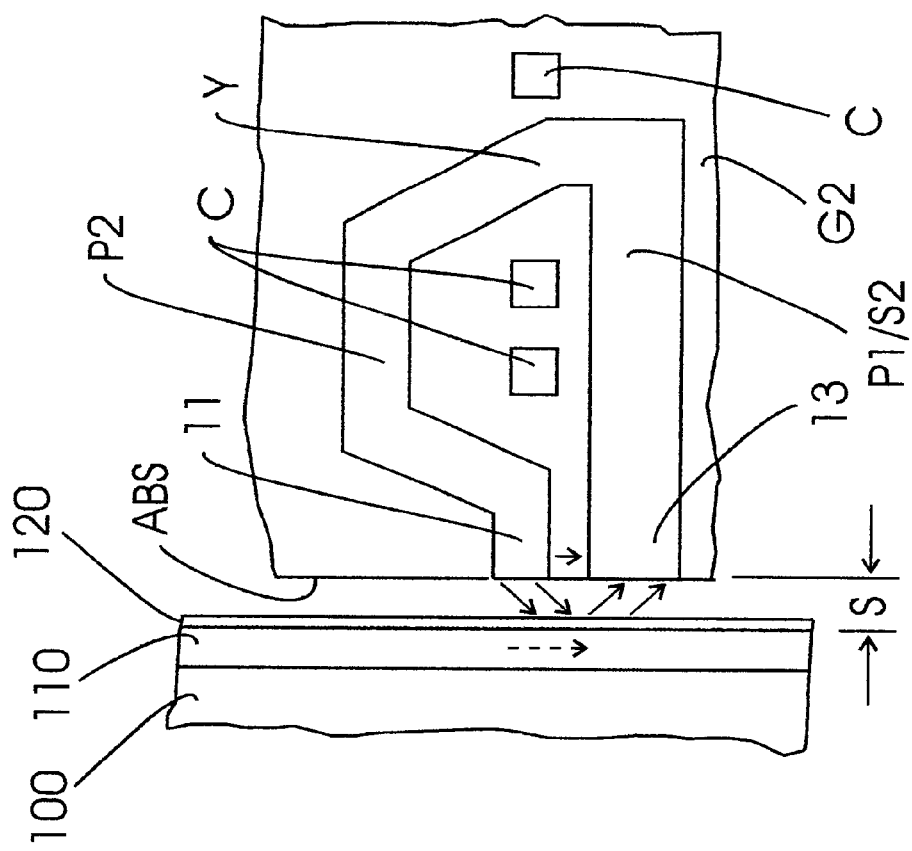
FIGS. 1A and 1B are sectional views of a portion of a prior art merged magnetoresistive (MR) read head and inductive write head, with the head shown adjacent a portion of a rotatable magnetic recording disk in FIG. 1B.
Figure 1A:
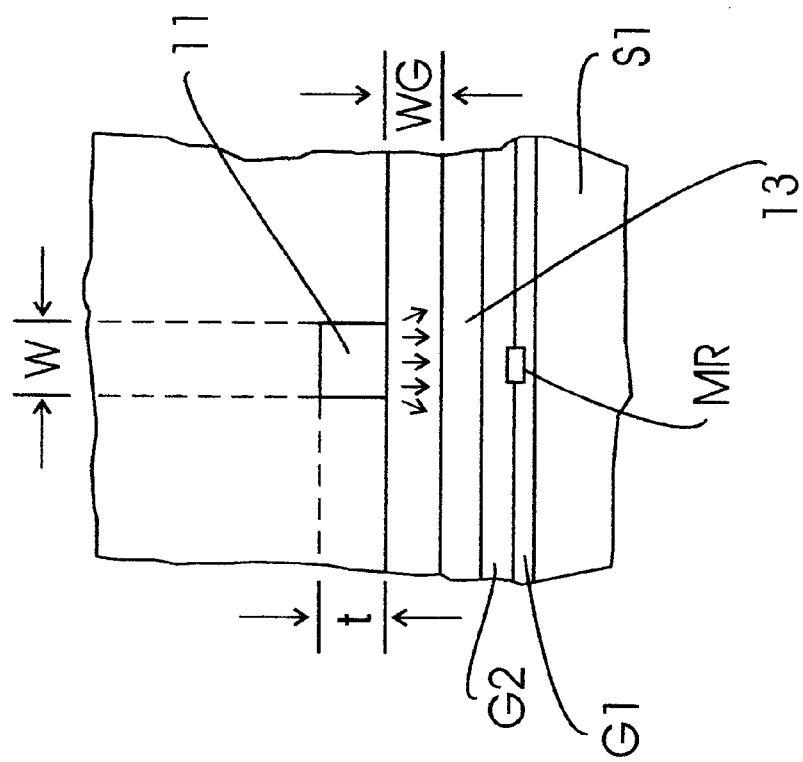

FIGS. 1A–1B illustrate a portion of a prior art merged magnetoresistive (MR) read head and inductive write head showing the read element MR and the inductive write head comprising yoke Y and coil C (the segments of coil C are shown in sectional view in FIG. 1B). The merged head is mounted on the trailing face or surface of a head carrier, such as an air-bearing slider. As shown in FIG. 1A, the read head includes the magnetoresistive element MR which is sandwiched between first and second gap layers G1 and G2, the gap layers in turn being sandwiched between first and second shield layers S1 and S2. In a merged head, the second shield layer S2 of the read head also serves as the bottom pole piece P1 for the write head (P1/S2). The magnetic field from the write head is produced in the write gap WG between the pole tips 11, 13 of the two magnetic pole pieces P1 and P2, as shown in FIG. 1A where the write head pole tips 11, 13 are viewed from the slider's air-bearing surface (ABS) directly above the disk. FIG. 1B also shows a section of a disk 100 facing the ABS and having a magnetic recording layer 110 located beneath a protective overcoat 120. The magnetic field generated by the write head has to overcome the coercivity of the magnetic recording layer 110 in order to write the data bit. The field limit of the write head is determined by the saturation moment of the materials used to fabricate the pole pieces. The width of the written bit is defined by the physical dimension of the write head pole tip 11 (its width w and thickness t) and by the amount of stray fringing field produced at the edges of the write head pole tips 11, 13, as shown by the arrows in FIG. 1A, and depends on the gap distance WG between the pole tips 11, 13 and the spacing S (FIG. 1B) between the ends of the pole tips 11, 13 and the magnetic recording layer 110 on the disk.

Preferred Embodiments

Figure 2:
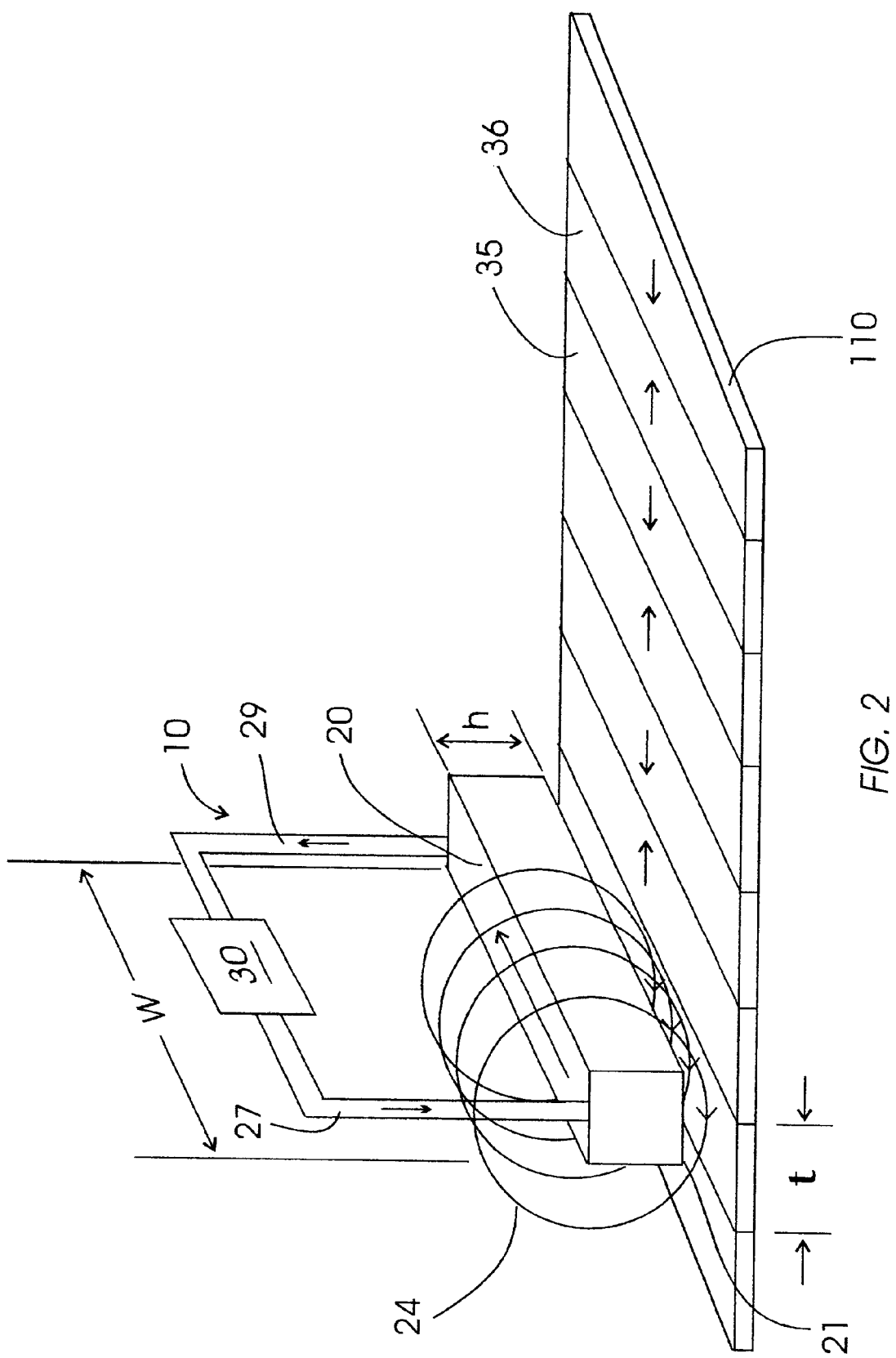
FIG. 2 is a schematic of an integrated TAMR head formed as a single coil with a current strip for generating both heat and a magnetic write field to the magnetic layer on the disk.
Figure 3:
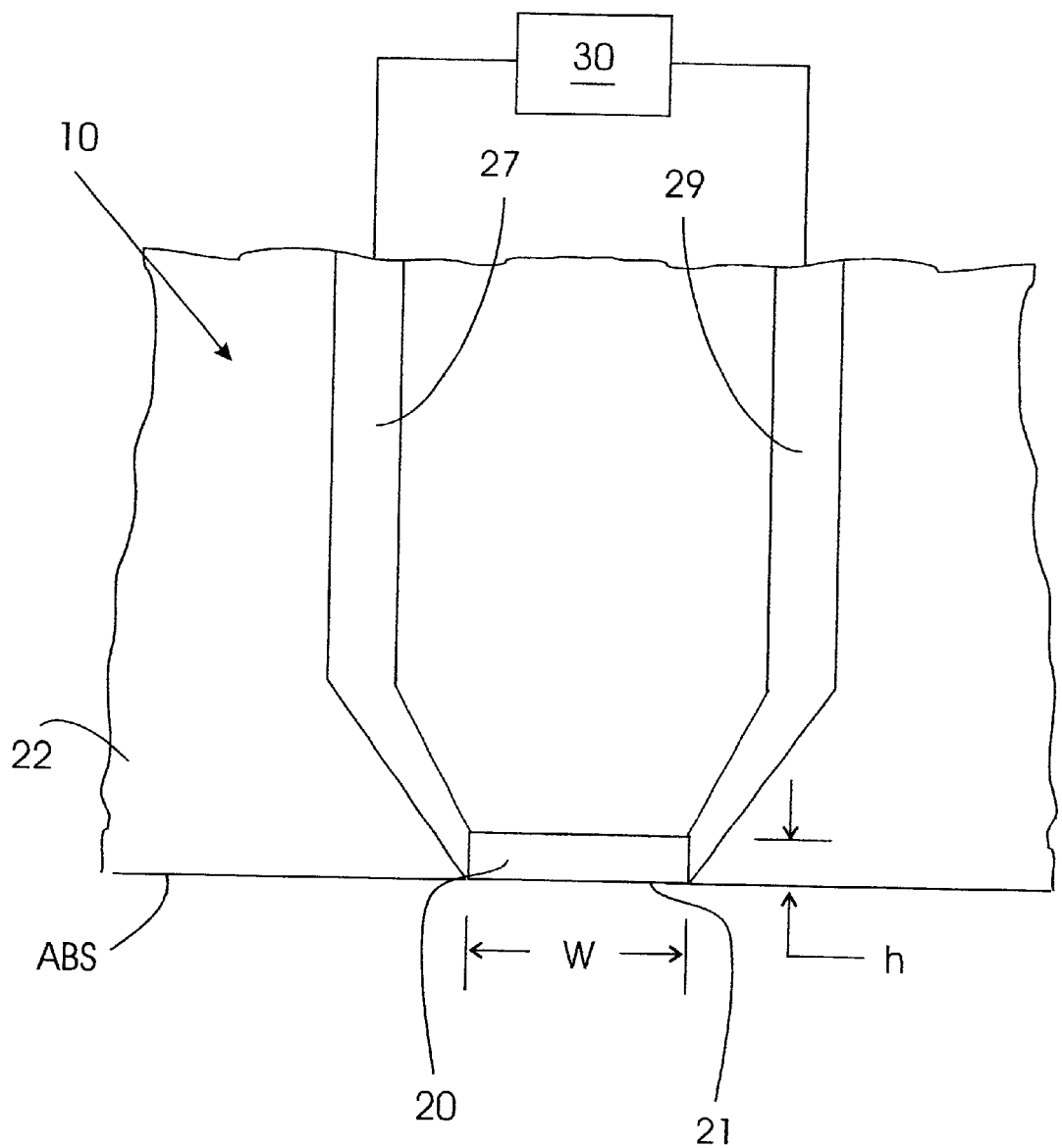
FIG. 3 is a view showing how the TAMR head of FIG. 2 is incorporated into an air bearing slider.

The present invention is a TAMR write head that integrates the inductive write head and the thermal heating element into the same physical structure. FIGS. 2 and 3 show the implementation schematically. A current strip 20 with a width w, height h and thickness t is heated by electrical current from a driver circuit 30. The strip 20 is part of a "single turn" coil 10 and thus generates a magnetic field shown by the magnetic field lines 24. For a very thin (small t) current strip, the magnetic field is equivalent to the magnetic field in conventional thin film inductive write heads. The heated current strip 20 is supported on a conventional head carrier, such as an air bearing slider in a magnetic recording disk drive, and is thus maintained in close proximity to the magnetic media, such as the magnetic recording layer 110 on a recording disk 100. Heat transfer from the bottom edge 21 or recording layer-facing surface of the current strip 20 increases the temperature of the magnetic material of layer 110, thereby lowering the coercivity of the magnetic material. The magnetic field 24 then switches the magnetization state of the media in the small regions representing the data bits. These regions are referred to as bits or bit cells, such as bit cells 35, 36, but it is actually the detection of the transition between two adjacent bit cells that results in a binary data bit being read by the disk drive. The heat dissipates quickly as the current strip is moved to the next data bit. The current direction through the strip 20 is switched to change the direction of magnetic field 24 so that the data bits can be written. The width w of the bottom edge of strip 20 essentially defines the width of the data bits and thus the data track width. This implementation permits both a large thermal gradient and a large magnetic field gradient and co-locates the two gradients to the same region on the recording layer 110.

FIG. 3 is a view showing how the current strip 20 is located on the trailing surface 22 of the head carrier, which in this figure is an air bearing slider. The structure of FIG. 3, which is the single turn coil 10 comprising the current strip 20 and leads 27, 29, is fabricated by depositing an electrically conductive layer with a thickness t by conventional techniques, such as sputter deposition or electroplating. The leads 27, 29 are patterned by conventional lithography. The current strip 20 is patterned to a width w and height h by conventional lithography, e-beam lithography or focused ion beam (FIB). Heat from the edge 21 of strip 20 is directed to the recording layer on the disk.

The current strip 20 is made of aluminum, copper or other metallic conductor. The total resistance and the magnetic field generating properties of strip 20 may be selected by design of the dimensions and material of the strip 20 and the current density through the strip. In one embodiment, the strip is made of aluminum with a thickness t of 800 nm, a height h of 100 nm and a width w of 150 nm, and the current density is $3.5 \times 10^8$ amps/cm$^2$. This would generate a magnetic field of approximately 2000 Oe.

In this design of a TAMR write head, wherein the inductive write head and the resistive heater are integrated as a single element, the write head and heater are aligned physically, which thereby perfectly aligns the temperature gradient and the magnetic field gradient so that they are co-located to the same region on the media corresponding to the recorded data bit. In addition, the integrated TAMR head eliminates the use of magnetic material required for the inductive write head, i.e., the permalloy (NiFe) material used for the poles P2 and P1/S2 shown in the prior art FIGS. 1A–1B.

Figure 4:
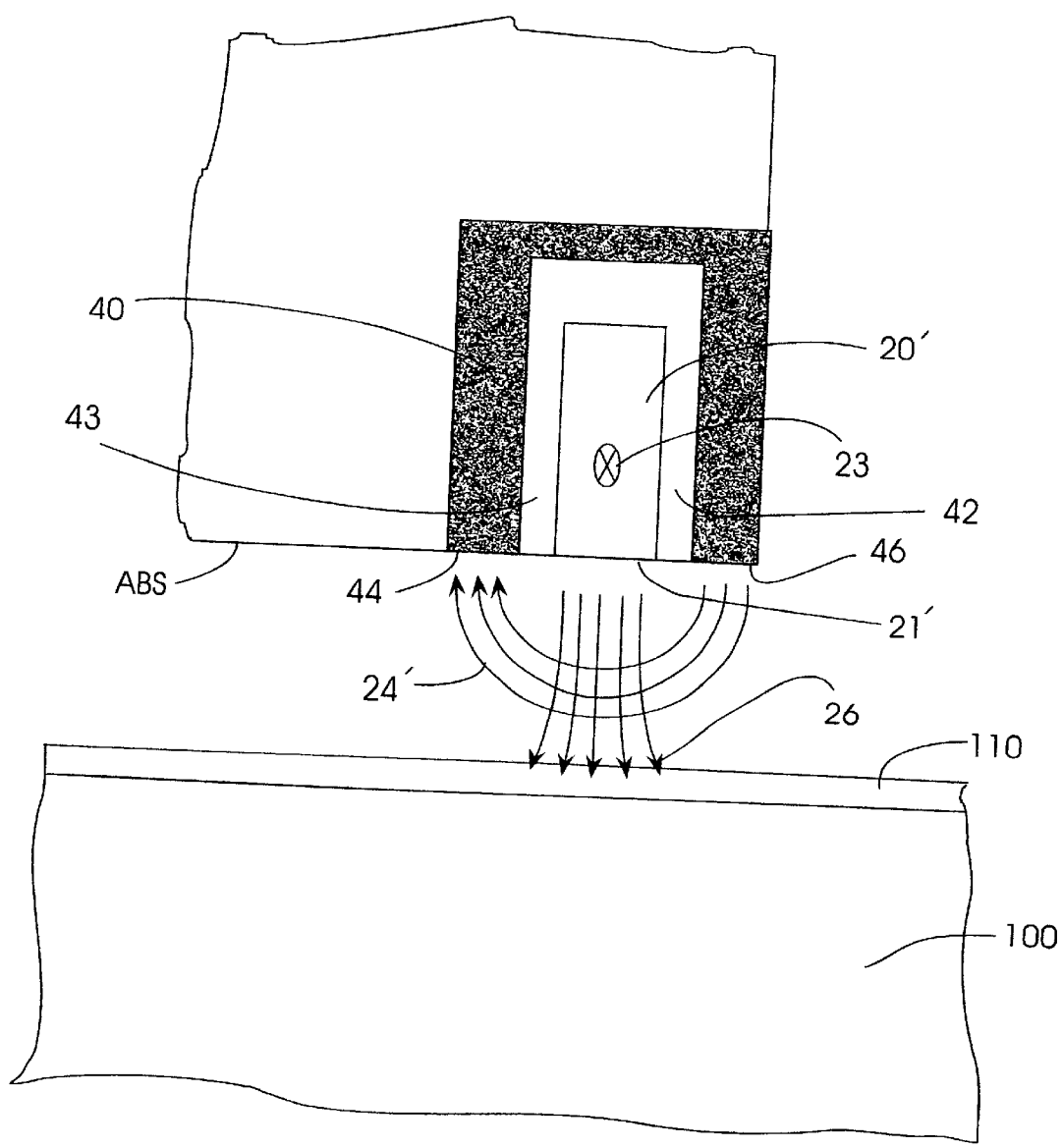
FIG. 4 is a schematic of an embodiment of the integrated TAMR head formed with a resistive heater as part of the single coil and located within a magnetic yoke.
Figure 5:
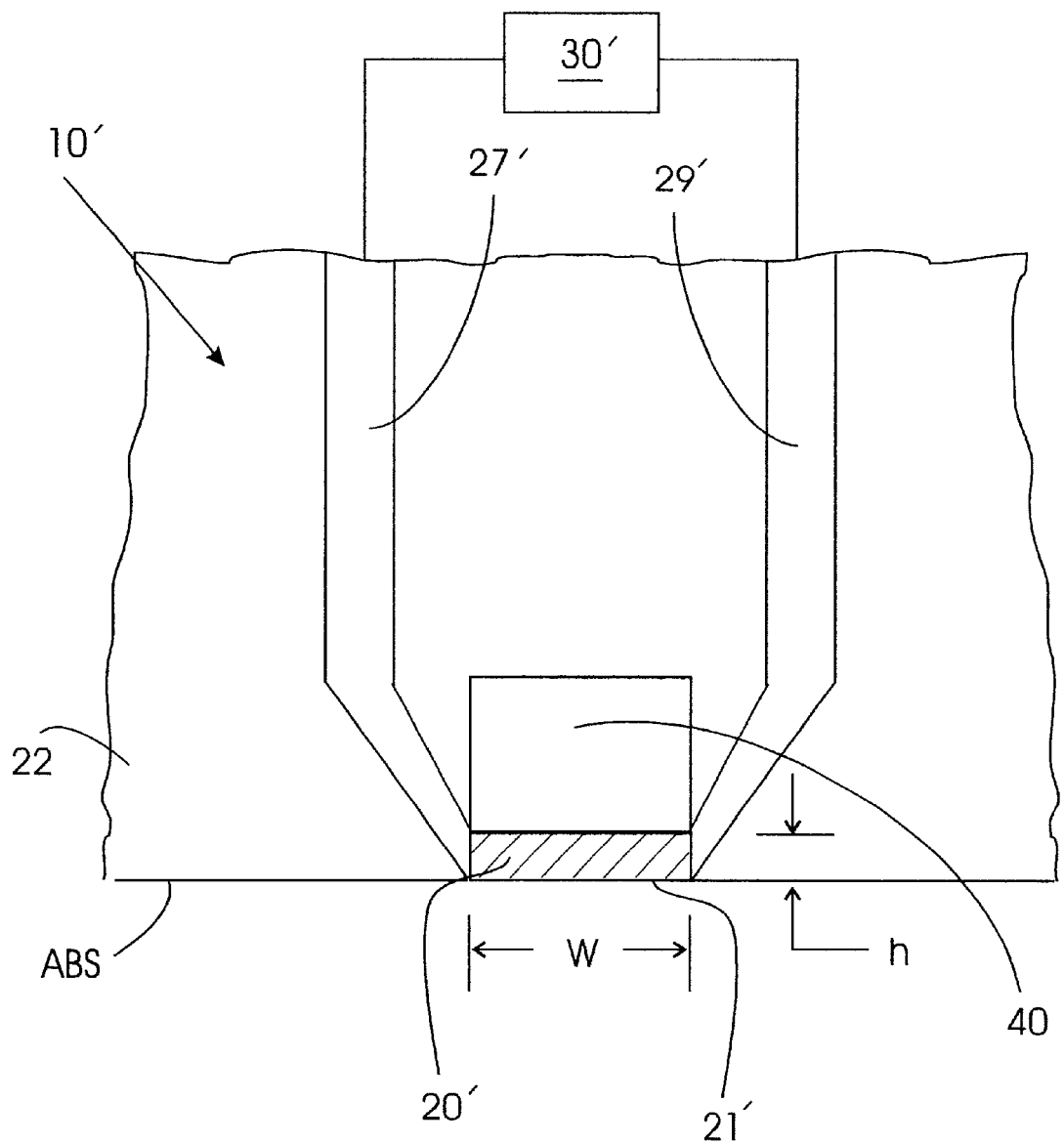
FIG. 5 is a view of the integrated TAMR write head embodiment of FIG. 4 as seen from the trailing surface of an air bearing slider.

FIGS. 4 and 5 illustrate an embodiment of the integrated TAMR write head wherein a magnetic yoke 40 is located around the current strip 20' of the single turn coil 10' to facilitate the magnetic field induced by the current strip 20'. The strip 20' is separated from the pole tips 44, 46 of magnetic yoke 40 by insulating spacer layers 42, 43. Yoke 40 can be formed of permalloy and the insulating region of spacer layers 42, 43 formed of alumina ($Al_2O_3$), both of which are well known materials used in conventional thin film inductive write heads. During recording, the write current is applied from the write driver circuitry 30' through the single turn coil 10' which includes the current strip 20' and its leads 27', 29'. The current through strip 20' is represented by arrow tail 23. The strip 20' generates a magnetic field, represented as arrows 24', which is directed by the surrounding yoke 40 through the yoke pole tips 44, 46. At the same time the current through strip 20' generates heat, represented as arrows 26, at its edge 21' which is then directed to the magnetic layer 110 of the recording disk to lower its coercivity, thereby assisting in the magnetization switching of the data bits by the magnetic field. To increase the heat generation the current strip 20' can be formed of a material with a higher electrical resistivity than the rest of the coil, as shown in FIG. 4. For example, strip 20' could be formed of Ni—Cr or Pt—Ir, and the remainder of coil 10' of copper. The value of the magnetic field generated from the single turn coil 10' can be calculated from l/g, where l is the write current and g is the write gap. If the write current is 50 mA and write gap is 60 nm, the deep gap magnetic field is about 10 kOe, which is adequate for TAMR.

Figures 6A, 6B:
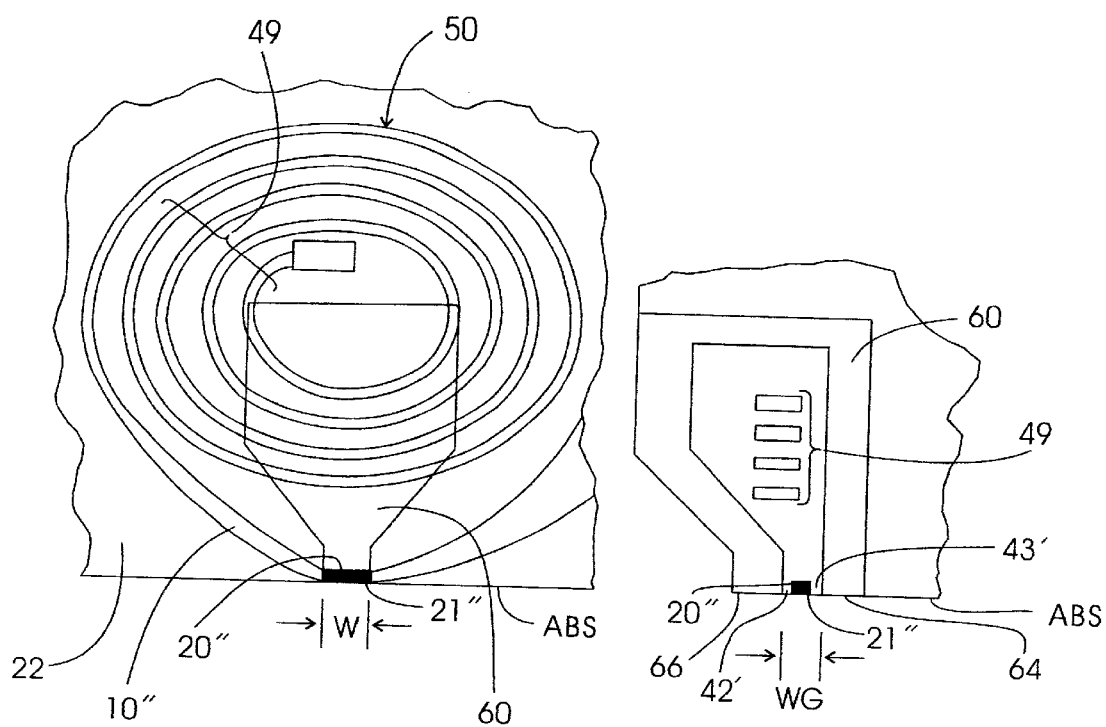
FIGS. 6A and 6B are end and side sectional views, respectively, of a variation of the embodiment of FIGS. 4 and 5 wherein the single coil is the primary turn of a multi-turn coil, the primary turn being located away from the secondary turns and between the pole tips of the magnetic yoke.

FIGS. 6A–6B illustrate a variation of the embodiment of the single turn coil integrated TAMR write head of FIGS. 4–5. In this integrated head, the single turn coil 10" is the primary turn of a multi-turn coil 50. The primary turn 10" of the coil 50 is located between the pole tips 64, 66 near the recording layer-facing surface (ABS) and away from the secondary turns 49 of coil 50. The secondary turns 49 are located within the yoke 60 but are away from the primary turn 10" so as to not be between the pole tips 64, 66. As shown in FIG. 5B, the current strip 20" is located between the two spacer layers 42', 43' which are between the two pole tips 64, 66 in the write gap. Like in the embodiment of FIGS. 4–5, the strip 20" may be formed of a material with higher electrical resistivity than the conductive material of the remainder of coil 10". During the write process, the current applied to coil 50 for energizing the yoke 60 is also the source for heating the current strip 20". The strip 20" not only generates heat at its edge 21" near the ABS for thermally assisting the writing, but also contributes to the generation of the magnetic write field across the pole tips 64, 66, which are also located near the ABS. Because the coil 10" is the primary turn electrically connected to secondary turns 49 of coil 50, the magnetic field it generates is in synchronization with the magnetic field generated by the secondary turns 49 in coil 50, so that there is no write asymmetry problem.

In the TAMR write head of FIGS. 6A–6B, if the write gap is 120 nm, then the use of a four turn coil 50 with the primary turn including the current strip 20" (with dimensions h=1 micron, w=0.2 microns, and t=50 nm) located near the recording layer-facing surface of the head carrier, the write head will produce a magnetic field of about 11 kOe at the 10 nm assumed magnetic spacing when a write current of 30 mA applied. This design is also compatible with the electrical layout and fabrication processing used in conventional thin film heads and does not require any additional leads or contact pads on the trailing surface of the slider.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A write head for thermally assisted recording of data bits in tracks of a magnetic recording layer, comprising:
    a head carrier having a recording layer facing surface and a trailing surface; and
    an electrically conductive coil having a single coil turn on the trailing surface, the single coil turn including a strip having an edge substantially at the recording layer facing surface and an edge width corresponding substantially to the data track width, so that when current is passed through the single coil turn a magnetic field and heat are generated at the edge of the strip, the generated heat being sufficient to elevate the temperature of the recording layer, thereby lowering its coercivity and permitting data bits to be more easily recorded by the magnetic field.

2. The head according to claim 1 further comprising a magnetically permeable yoke having pole tips substantially at the recording layer facing surface of the head carrier, the strip being located between the pole tips, whereby when current is passed through the single coil turn a magnetic field is induced across the pole tips of the yoke.

3. The head according to claim 2 wherein the head carrier is an air-bearing slider having an air-bearing surface as the recording layer facing surface, and wherein the edge of the strip and the first and second pole tips are substantially at the air-bearing surface.

4. The head according to claim 1 wherein the coil includes a plurality of secondary coil turns on the trailing surface and electrically connected to the single coil turn but spaced away from the strip.

5. The head according to claim 1 wherein the strip is formed of a material having an electrical resistivity greater than the electrical resistivity of the material for the remainder of the single coil turn.

6. The head according to claim 1 wherein the head carrier is an air-bearing slider having an air-bearing surface as the recording layer facing surface.

7. A thin film write head for thermally assisted magnetic recording, comprising:
    a substrate;
    a magnetic yoke on the substrate, the yoke comprising first and second pole pieces, each pole piece having a pole tip, the pole tips being spaced-apart to define a gap; and
    a coil layer located within the yoke for generating a magnetic field across the pole tips when current is passed through the coil, the coil layer including a strip located between the pole tips for generating heat when current is passed through the coil, the generated heat being sufficient to permit thermally assisted magnetic recording.

8. The head according to claim 7 further comprising a first insulating spacer layer located in the gap adjacent the first pole tip and a second insulating spacer layer located in the pole gap adjacent the second pole tip, and wherein the strip is located between and in contact with the first and second insulating spacer layers.

9. The head according to claim 7 wherein the substrate is the trailing surface of an air-bearing slider.

10. The head according to claim 9 wherein the air-bearing slider has an air-bearing surface substantially perpendicular to the trailing surface, wherein the first and second pole tips are substantially at the air-bearing surface, and wherein the strip has an edge substantially at the air bearing surface.

11. The head according to claim 7 wherein the coil layer includes a primary coil turn located between the pole tips and secondary coil turns electrically connected to the primary coil turn but not located between the pole tips, and wherein the strip is part of the primary coil turn.

12. A magnetic recording disk drive, comprising:
- a rotatable magnetic recording disk comprising a substrate and a magnetic recording layer on the substrate;
- a slider having a disk-facing surface and a trailing face and being maintained in proximity to the disk; and
- a thermally assisted magnetic write head formed on the trailing face of the slider and comprising
    - a magnetic yoke having first and second pole pieces, each pole piece having a pole tip facing the disk, the pole tips being spaced-apart so as to define a write gap;
    - a first spacer layer located in the gap adjacent the first pole tip;
    - a second spacer layer located in the gap adjacent the second pole tip; and
    - a coil layer located within the yoke between the first and second spacer layers, the coil layer including a primary coil turn between the pole tips for generating a magnetic field across the pole tips, the primary coil turn including a strip substantially at the disk facing surface for heating the magnetic recording layer on the disk, so that when electrical current is applied to the primary coil turn a magnetic field and heat are directed simultaneously to the recording layer on the disk, the temperature of the disk being raised sufficiently to decrease its coercivity, thereby permitting the magnetic field to more easily record data bits in the disk.

13. The disk drive according to claim 12 wherein the strip is formed of a material having an electrical resistivity greater than the electrical resistivity of the material for the remainder of the primary coil turn.

14. The disk drive according to claim 12 wherein the coil layer includes secondary coil turns electrically connected to the primary coil turn but not located between the pole tips.

* * * * *